United States Patent [19]
Gudmundson et al.

[11] Patent Number: 5,790,516
[45] Date of Patent: Aug. 4, 1998

[54] PULSE SHAPING FOR DATA TRANSMISSION IN AN ORTHOGONAL FREQUENCY DIVISION MULTIPLEXED SYSTEM

[75] Inventors: Perols Leif Mikael Gudmundson, Kista; Lars Gustav Brismark, Solluntuna; Per-Olof Anderson, Hässelby, all of Sweden

[73] Assignee: Telefonaktiebolaget LM Ericsson, Stockholm, Sweden

[21] Appl. No.: 502,633

[22] Filed: Jul. 14, 1995

[51] Int. Cl.⁶ .................................................. H04L 27/32
[52] U.S. Cl. ................................................................ 370/210
[58] Field of Search ........................................ 370/203, 208, 370/210, 536, 537, 281, 295, 482, 485; 375/295, 298, 316

[56] References Cited

U.S. PATENT DOCUMENTS

| | | | |
|---|---|---|---|
| 3,864,521 | 2/1975 | DeLong et al. | 179/2.5 |
| 4,528,656 | 7/1985 | Morais | 370/30 |
| 4,736,453 | 4/1988 | Schloemer | 455/33 |
| 4,783,754 | 11/1988 | Bauck et al. | 364/513.5 |
| 4,783,779 | 11/1988 | Takahata et al. | 370/69.1 |
| 4,930,120 | 5/1990 | Baxter et al. | 370/73 |
| 5,014,342 | 5/1991 | Pudsey | 455/33 |
| 5,109,529 | 4/1992 | Akaiwa | 455/34.1 |
| 5,128,964 | 7/1992 | Mallory | 375/39 |
| 5,161,154 | 11/1992 | Diaz et al. | 370/95.1 |
| 5,191,576 | 3/1993 | Pommier et al. | 370/18 |
| 5,203,012 | 4/1993 | Patsiokas et al. | 455/34.1 |
| 5,239,682 | 8/1993 | Strawcynski et al. | 455/54.1 |
| 5,249,304 | 9/1993 | Mulford | 455/34.1 |
| 5,260,968 | 11/1993 | Gardner et al. | 375/1 |
| 5,263,176 | 11/1993 | Kojima et al. | 455/34.1 |
| 5,282,222 | 1/1994 | Fattouche et al. | 375/1 |
| 5,289,464 | 2/1994 | Wang | 370/69.1 |
| 5,295,138 | 3/1994 | Greenberg et al. | 370/57 |
| 5,311,550 | 5/1994 | Fouche et al. | 375/38 |
| 5,319,795 | 6/1994 | Hamabe et al. | 455/33.2 |
| 5,345,440 | 9/1994 | Gledhill et al. | 370/19 |
| 5,357,502 | 10/1994 | Castelain et al. | 370/19 |
| 5,416,767 | 5/1995 | Koppelaar et al. | 375/260 |
| 5,471,464 | 11/1995 | Ikeda | 375/364 |
| 5,548,582 | 8/1996 | Brajal et al. | 375/202 |
| 5,608,764 | 3/1997 | Sugita et al. | 375/344 |

FOREIGN PATENT DOCUMENTS 0 441 732 A1  5/1991  European Pat. Off. .

OTHER PUBLICATIONS

Anders Vahlin and Nils Holte, *Optimal Finite Duration Pulses for OFDM;* 1994 IEEE Globecom, Communications: The Global Bridge Conference, San Francisco, Nov. 8–Dec. 2, 1994, vol. 1, Nov. 29, 1994, pp. 258–262.

Leonard J. Cimini, Jr., IEEE Transactions on Communications, vol. COM–33, No. 7, Jul. 1985, "Analysis and Simulation of a Digital Mobile Channel Using Orthogonal Freqeuncy Division Multiplexing", pp. 665–675.

M. Alard and R. Lassalle, EBU Review, Technical No. 224, Aug. 1987, "Principles of Modulation and Channel Coding for Digital Broadcasting for Mobile Receivers", pp. 47–69.

D. DiZenobio, G. Santella and Doundazione Ugo Bordoni, The Fourth International Symposium on Personal, Indoor and Mobile Radio Communications, Yokohama, Japan, Sep. 8–11, 1993, "OFDM Technique for Digital Television Broadcasting to Portable Receivers", pp. 244–248.

(List continued on next page.)

*Primary Examiner*—Chi H. Pham
*Assistant Examiner*—Ricky Q. Ngo
*Attorney, Agent, or Firm*—Jenkens & Gilchrist, P.C.

[57] ABSTRACT

A method and system for data transmission in a orthogonal frequency division multiplexed (OFDM) system is provided. In the invention each of a plurality of data symbols $C_k$, having a symbol period T, are modulated onto one of a plurality of subcarriers comprising a first data signal. The first data signal is then multiplied by a pulseshaping function over the period T to generate a second data signal. The second data signal is then transmitted on a system carrier over a communications channel of the OFDM system.

28 Claims, 5 Drawing Sheets

OTHER PUBLICATIONS

Håkan Eriksson and Randall Bownds, IEEE 1991, "Performace of Dynamic Channel Allocation in the DECT System", pp. 693–698.

Reiner Beck and Herbert Panzer, IEEE 1989, "Strategies for Handover and Dynamic Channel Allocation in Micro-Cellular Mobile Radio Systems", pp. 178–185.

Syugi Yasuga and Seizo Onoe, IEEE 1992, "Autonomous Channel Assignment Control for Flexible Reuse in Mobile Radio Systems", pp. 798–801.

Håkan Andersson, Håkan Eriksson, Anna Fallgren and Magnus Madfors, IEEE 1992, "Adaptive Channel Allocation in a TIA IS–54 System", pp. 778–781.

Håkan Eriksson, IEEE 1988, "Capacity Improvement by Adaptive Channel Allocation", pp. 1355–1359.

Eduardo F. Casa and Cyril Leung, IEEE 1991, "OFDM for Data Communication Over Mobile Radio FM Channels—Part I: Analysis and Experimental Results", pp. 783–793.

Proceedings of the Global Telecommunications Conference (GLOBECOM), San Francisco, Nov. 28–Dec. 2, 1994, vol. 1, 28 Nov. 1994—2 Dec. 1994, Institute of Electrical and Electronics Engineers, Optimal Finite Duration Pluses for OFDM.

PULSE SHAPING FOR DATA TRANSMISSION IN AN ORTHOGONAL FREQUENCY DIVISION MULTIPLEXED SYSTEM

BACKGROUND OF THE INVENTION

1. Field of the Invention

This invention relates to telecommunications systems and, more particularly, to a method and system of pulseshaping for data transmission in an orthogonal frequency division multiplexed (OFDM) system.

2. History of the Prior Art

In radio telecommunications systems a common technique for transmitting information is to divide the information into separate units and then transmit each unit on a separate RF subcarrier. The separate units can then be received from each subcarrier at a receiver and the original information can be reconstructed. This type of technique for transmitting is known as multicarrier modulation (MCM).

Orthogonal frequency division multiplexing (OFDM) is a particular method of MCM. An OFDM signal consists of a number of subcarriers multiplexed together, each subcarrier at a different frequency and each modulated by a signal the level of which varies discretely rather than continuously.

Because the level of the modulating signal varies discretely, the power spectrum of each subcarrier follows a $(\sin x/x)^2$ distribution. For an OFDM system, the subcarrier frequencies $f_k$, $k=0 \ldots, N-1$, are defined so the subcarriers are orthogonal, i.e., the power spectra of each of the subcarriers is zero at the frequencies of each of the other subcarriers.

A set of data symbols $C_k$, wherein $k=0 \ldots, N-1$, (i.e., complex numbers representing the information to be transmitted) is used to modulate the N subcarriers in an OFDM system. Each data symbol $C_k$ modulates a subcarrier at a given frequency $f_k$. The particular way in which the information is represented as a complex number depends on the modulation method. Common modulation methods include phase shift keying (PSK), differential phase shift keying (DPSK), quadrature phase shift keying (QPSK) and differential quadrature phase shift keying (DQPSK).

The subcarrier frequencies, $f_k$, $k=0 \ldots, N-1$, for N subcarriers in an OFDM system are defined by the set of base functions:

$$\Psi_k(t) = \begin{cases} e^{j2\pi f_k t}, & 0 \leq t < T \\ o & \text{otherwise} \end{cases}$$

The smallest difference between two frequencies $f_i$ and $f_j$, such that the two base functions are orthogonal, is $1/T$, so the subcarrier frequencies are defined as:

$$f_k = f_c + \frac{k}{T}, \text{ wherein } k = 0, \ldots, N-1$$

and wherein $f_c$ is the system carrier frequency and T is the symbol time (the time duration of a data symbol). The subcarrier separation is then defined as $f_o = 1/T$.

The sum of all N signals is called an OFDM signal. The transmitted signal in the time interval [0–T] can be represented as:

$$x(t) = \sum_{k=0}^{N-1} C_k \Psi_k(t)$$

If y(t) is the signal received at the receiver, the data can be detected by the operation:

$$C_k \text{ received} = \frac{1}{T} \int_0^T y(t) \Psi_k^*(t) dt$$

wherein $\Psi_k^*$ is the complex conjugate of $\Psi_k(t)$.

The above description considers only one time interval, from [0–T]. By performing identical operations for other time intervals of equal length, the whole transmitted signal can be constructed and decoded by summing time-delayed versions of x(t), but with different sets of data symbols, $C_k^{(m)}$, for different time intervals m.

As an example of how an OFDM signal may be constructed, let N=4 and consider the transmission of 8 data symbols over 2 time intervals m=1 and m=2. For purposes of explanation only the real portion of the data symbols will be considered. It is understood by those skilled in the art that the data representing a symbol consists of real and imaginary parts. The 8 data symbols $C_k^{(m)}$ can be defined as:

$$C_0^{(1)}=1 \ C_1^{(1)}=1 \ C_2^{(1)}=-1 \ C_3^{(1)}=-1$$
$$C_0^{(2)}=1 \ C_1^{(2)}=-1 \ C_2^{(2)}=1 \ C_3^{(2)}=1$$

Figure 1:
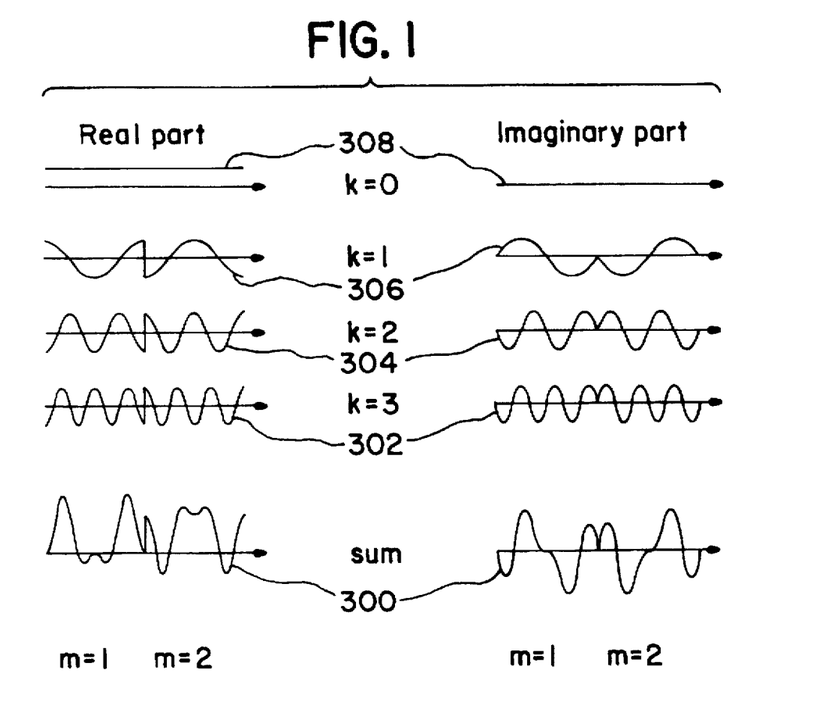
FIG. 1 illustrates real and imaginary parts of two OFDM symbols.

Referring now to FIG. 1, therein are illustrated real and imaginary parts of two OFDM symbols with 8 data symbols being transmitted over 2 time intervals m=1 and m=2. Signal 300 is the summation of signals 302, 304, 306 and 308. The signals 302, 304, 306 and 308 represent each of the data signals at the subcarrier frequencies $f_k$, wherein $k=0, \ldots, 3$, which comprise the composite signal 300. For example, if symbols $C_0^{(1)}=C_0^{(2)}=1$ and $C_1^{(m)}$, $C_2^{(m)}$ and $C_3^{(m)}$ are equal to zero, for m=1 and m=2, the transmitted signal would appear as signal 308 in FIG. 1.

The Fourier transform of $\Psi_k(t)$ is a $\sin(x)/x$-shaped function centered at $f=f_k$. The frequency spectra of the different $\Psi_k$ will therefore overlap. However, they are still orthogonal and in particular, where each spectra is maximum, the others are zero.

Figure 2:
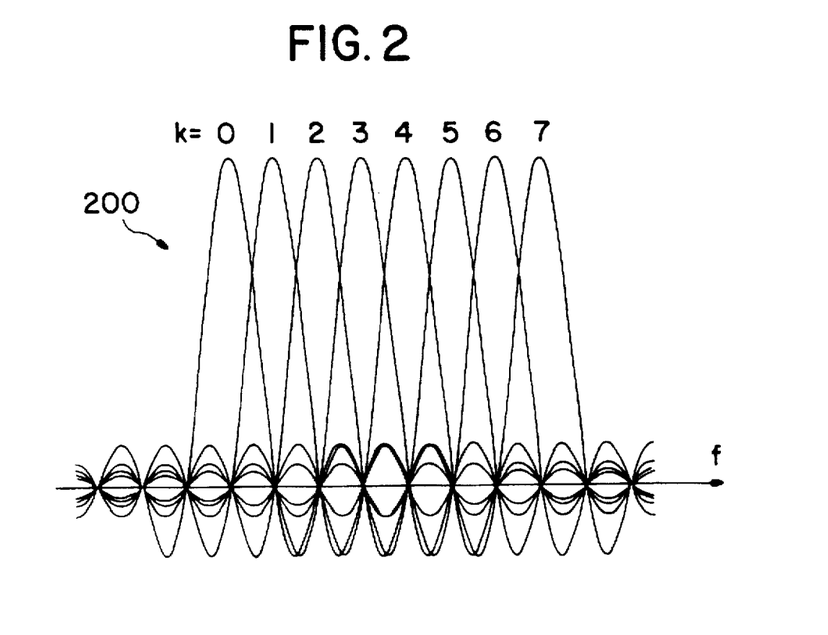
FIG. 2 illustrates the frequency spectra for an OFDM signal.

Referring now to FIG. 2, therein are illustrated the frequency spectra for $\Psi_k(t)$. Spectra are shown in FIG. 2 for $k=0, \ldots, 7$, i.e., for N=8. From FIG. 2 it can be seen that by sampling the transmitted signal x(t) at the frequencies $f_k$ the individual data symbols can be retrieved without interference from other symbols.

The above description of OFDM assumes that there is only one user who is sending information on all N subcarriers. This would be the case in point to point systems such as modems or, in broadcast systems such as high definition television (HDTV). However, OFDM also has application to multiaccess telecommunications systems. In a typical multiaccess telecommunications system using OFDM, there would be many users in the same frequency band, sharing the frequency spectrum. A cellular system is a particular example of this type of system. In downlink (base station to mobile station) transmissions in a cellular system the base station can multiplex all users on different subcarriers. In the uplink (mobile station to base station) transmissions, each mobile station can be assigned a set of subcarriers less than the total number of subcarriers used by the particular base station in the link and can perform the construction of OFDM signals as described above.

Ideally, on an additive white Guassian noise (AWGN) channel, the OFDM signal x(t) can be transmitted and received without intersymbol interference (ISI). However, on a typical radio channel time dispersion and frequency dispersion (Doppler spread) effect the validity of the received signal. From FIG. 2 it is clear that Doppler spread would destroy the orthogonality of the subcarriers since the zero crossings of the individual subcarrier spectra would shift arbitrarily. This causes ISI between the data symbols transmitted on the different subcarriers. Additionally, from FIG. 2 it can be seen that there may be significant out of band interference caused by an OFDM system. For example, if the frequencies above $f_7$ were allocated to a second system, there could be significant interference in that frequency band caused by the spectra of the subcarriers $f_k$ of FIG. 2. The slower the spectra decays, the greater the interference.

Similarly, FIG. 1 indicates that time dispersion effects on the transmitted signal would create interference between symbols in the adjacent time periods m=1 and m=2.

For single carrier systems the usual way to handle ISI is by utilizing an equalizer in the receiver. For OFDM systems, ISI is much simpler to handle because the symbol time T in OFDM systems is generally much longer than in single carrier systems. ISI between the data symbols carried on the different subcarrier frequencies can be reduced by proper choice of the symbol time T and thus subcarrier separation $f_o$. ISI between time intervals can be avoided by introducing a guard time between time intervals in which the data symbols are transmitted. The guard time is introduced by a periodic extension of the transmitted signal x(t) derived during an interval of length T+t, where t is the guard interval. With a guard time introduced, the received values are detected by the operation:

$$C_k \text{ received} = \int_0^{t+T} y(t)\Psi_k^*(t)dt$$

wherein y(t) is the signal received. In this case $C_k=C_k$ received, for k=0, 1, ..., N−1 (assuming the phase shift can be retrieved by e.g. a pilot signal), if the maximum time spread is less than the guard interval.

By using guard intervals as described above, interference between different blocks of data is avoided. The detection of one block does not take place until all remains of the previous block have disappeared from the channel. The guard intervals handle time delay as long as the guard intervals are longer than the longest time dispersion on the channel. However, if there is longer time dispersion, the orthogonality of the subcarriers is no longer preserved, resulting in a degradation of performance. Additionally, the use of guard intervals does not reduce Doppler spread effects on the received signal out of band interference, and/or frequency synchronization errors.

It would provide an advantage then to have a method and system for use in an OFDM system that would desensitize the OFDM signal to time dispersion and also reduce the effects of Doppler spread on the received OFDM signal. Additionally, it would provide a further advantage if the method and system had the effect of reducing out of band interference.

SUMMARY OF THE INVENTION

The present invention provides a method and system of pulseshaping for data transmission in an orthogonal frequency division multiplexed system (OFDM) that lessens the effects of both time dispersion and Doppler spread intersymbol interference (ISI) on the received OFDM signal. The present invention also reduces out of band interference in an OFDM system.

Conventional methods of reducing ISI involve introducing a guard time between the intervals in which the data symbols are transmitted. The guard time is introduced by a periodic extension of the transmitted signal for certain length of time. Use of a guard time does not, however, reduce interference between OFDM subcarriers caused by the effects of Doppler spread. The present invention provides an advantage over guard time in that both time dispersion and Doppler spread effects are reduced.

In the invention each of a plurality of data symbols having a symbol period T are modulated onto one of a plurality of subcarriers to generate a plurality of modulated subcarriers that comprise an OFDM data signal. The composite OFDM data signal is then multiplied by a pulseshaping function before being transmitted on a system carrier over a system channel.

In an embodiment of the invention the pulseshaping function may be a raised cosine pulse over the period T. In this embodiment the rolloff factor of the raised cosine pulse determines the amount of reduction of ISI. The higher the rolloff factor, the greater the reduction in ISI. The frequencies of the subcarriers used are also determined by the rolloff factor of the raised cosine pulse. The higher the rolloff factor, the greater the reduction in the number of subcarriers that can be used. With a constant frequency bandwidth available to a system, any reduction in the number of usable subcarriers caused by pulseshaping can be weighed against the reduction in intersymbol interference (ISI), provided the rolloff factor used.

DETAILED DESCRIPTION OF THE INVENTION

Pulseshaping for data transmission in the present invention is accomplished by multiplying an OFDM signal with a pulseshaping waveform w(t) before the signal is transmitted on the OFDM channel. In the invention the transmitted OFDM signal x(t) for each time period is given by:

$$x(t) = w(t) \sum_{k=0}^{N-1} C_k \Psi_k(t)$$

and $f_k$ is redefined in the invention as:

$$f_k = f_c + \frac{\propto k}{T}, k = 0, \ldots, N-1$$

where $\propto$ is an frequency adjustment factor that depends on the pulseshaping function w(t) used. If y(t) is the received signal, the data can be detected at the receiver by the operation:

$$C_k \text{ received} = \frac{1}{T} \int_0^T y(t) \Psi_k^*(t) dt$$

Figure 3A:
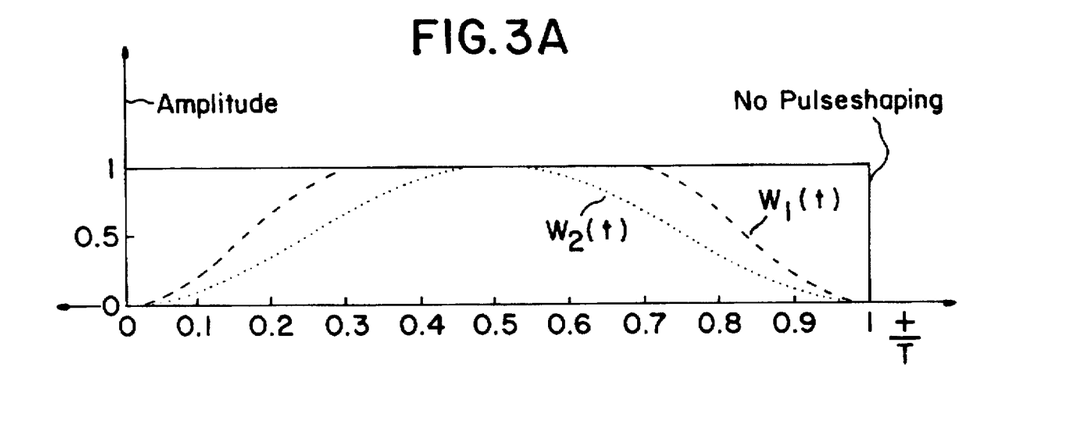
FIG. 3A–3C illustrates the time domain pulse shape, the frequency response and the frequency response on an extended scale, respectively, for two pulseshaping functions.
Figure 3B:
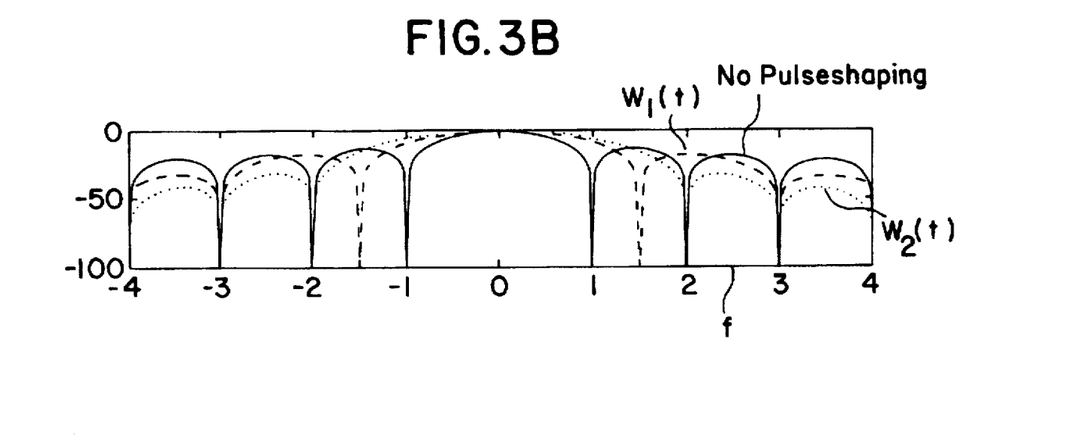
Figure 3C:
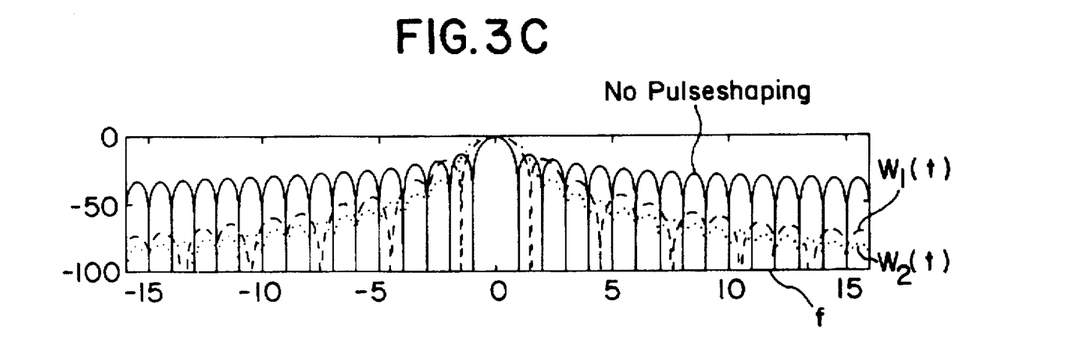

Referring now to FIGS. 3A, 3B and 3C, therein are shown the time domain pulse shape, the frequency response and, the frequency response on an extended scale, respectively, for two examples of pulseshaping functions $w_1(t)$ and $w_2(t)$. For comparison purposes, the responses of a channel using no pulseshaping are also illustrated in FIGS. 3A, 3B and 3C. The time and frequency scales are normalized for symbol time T and subcarrier frequency $f_c=0$. The pulseshaping functions are defined as raised cosine pulses with a rolloff factor B of ½ for $w_1(t)$ and 1 for $w_2(t)$. The raised cosine pulse is given by:

$$w(t) = \frac{1 - \cos 2\pi t/TB}{2}, 0 \leq t < \frac{T}{2} B$$

$$w(t) = 1, \frac{TB}{2} \leq t < T - \frac{TB}{2}$$

and, $$w(t) = \frac{1 - \cos(2\pi(T-t)/TB)}{2}, T - \frac{TB}{2} < t \leq T, \text{ for } 0 < B \leq 1,$$

The pulse duration T of all three cases is the same in FIG. 3A.

FIG. 3A shows that use of pulseshaping by multiplying x(t) by the pulseshaping function $w_1(t)$ or $w_2(t)$, on the interval $0 \leq t < T$ will attenuate the first and last portions of the signal x(t) since the amplitude of $w_1(t)$ and $w_2(t)$ rises slowly at the beginning and decays at the end of the period T. This will reduce sensitivity when portions of OFDM symbols from different time periods overlap due to time dispersion. When no pulseshaping is used, the signal x(t) is not attenuated over the period T.

In FIGS. 3B and 3C the decay rate of the spectral density in the frequency responses of the pulseshaping functions $w_1(t)$ and $w_2(t)$ are much greater than that of a channel when no pulseshaping is used. The decay rate depends directly on the rolloff factor B. After multiplication, the faster spectral decay of the pulseshaping causes each subcarrier of the transmitted signal x(t) to be less sensitive to Doppler spread than the subcarrier would be without pulseshaping. The faster spectral decay rate also results in a total system baseband with a fast spectral decay rate. This will reduce out of band interference.

FIGS. 3B and 3C also show that the spectra of pulseshaping functions are wider, depending on the rolloff factor B, than the spectra of the frequency response of a channel when no pulseshaping is used. For example, the spectra of $w_2(t)$ with a B of 1 has a width of twice the spectra of the frequency response of a channel when no pulseshaping is used. Setting B equal 0 is equivalent to using no pulseshaping at all and results in the spectra shown for no pulseshaping. The change in spectra when using pulseshaping changes the orthogonality relationships of the subcarriers within a particular frequency band. Therefore, using a particular pulseshaping function may require adjustment in the choice of subcarriers chosen in order to maintain orthogonality during data transmission. The frequency adjustment factor $\propto$ is used for this adjustment. $\propto$ is defined as:

$$\frac{2}{2-B}$$

As an example of subcarrier frequency adjustment, if the pulseshaping function $w_2(t)$ comprising the Hanning function is used the pulse shaping function can be defined as:

$$w_2(t) = \frac{1 - \cos(2\pi t/T)}{2}, 0 \leq t \leq T$$

For the Hanning function B=1 and $\propto$=2. In the invention the subcarrier frequencies are defined as:

$$f_k = f_c + \frac{2k}{T}, k = 0, \ldots, \frac{N}{2} - 1,$$

Therefore, for a given bandwidth, every second subcarrier, as compared to conventional OFDM, is utilized to transmit the set of data symbols defined by $C_k^{(m)}$. Each symbol $C_k$ is transmitted on the subcarrier having a frequency $f_k$ as defined above. The transmitted signal x(t) is then:

$$x(t) = w(t) \sum_{k=0}^{\frac{N}{2}-1} C_k \Psi_k(t) dt$$

If y(t) is the received signal, the transmitted data can be recovered at the receiver by the operation:

$$C_k \text{ received} = \frac{1}{T} \int_0^T y(t) \Psi_k^*(t) dt$$

Figure 5:
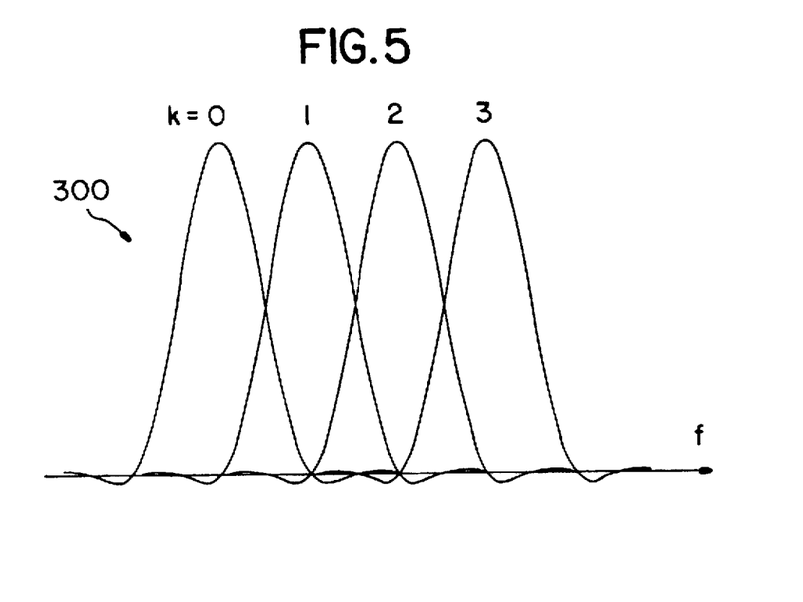
FIG. 5 illustrates the frequency spectra for an OFDM signal resulting from pulseshaping performed according to the teachings of the present invention.

Referring now to FIG. 5 therein is illustrated the frequency spectra for $w(t)\Psi_k(t)$ wherein k=0, 1, 2, 3. From FIG. 5 it can be seen that by sampling the transmitted signal x(t) at the frequencies $f_k$ the individual data symbols can be retrieved without interference from other signals.

The frequency spectra shown in FIG. 5 shows the faster spectral decay rate of the subcarriers $f_0$, $f_1$, $f_2$, and $f_3$ that results from the pulseshaping. When compared to conventional OFDM, for example, as shown in FIG. 2, it is evident that Doppler spread sensitivity between subcarriers will be reduced. It is also evident that out of band interference will be reduced because of the more rapid decay of the spectral density.

For a fixed given bandwidth, the pulseshaping of the invention requires less data symbols per unit time than conventional OFDM in which every available orthogonal subcarrier is used.

An embodiment of the invention which uses the pulseshaping function represented by a raised cosine pulse will now be described.

Figure 4A:
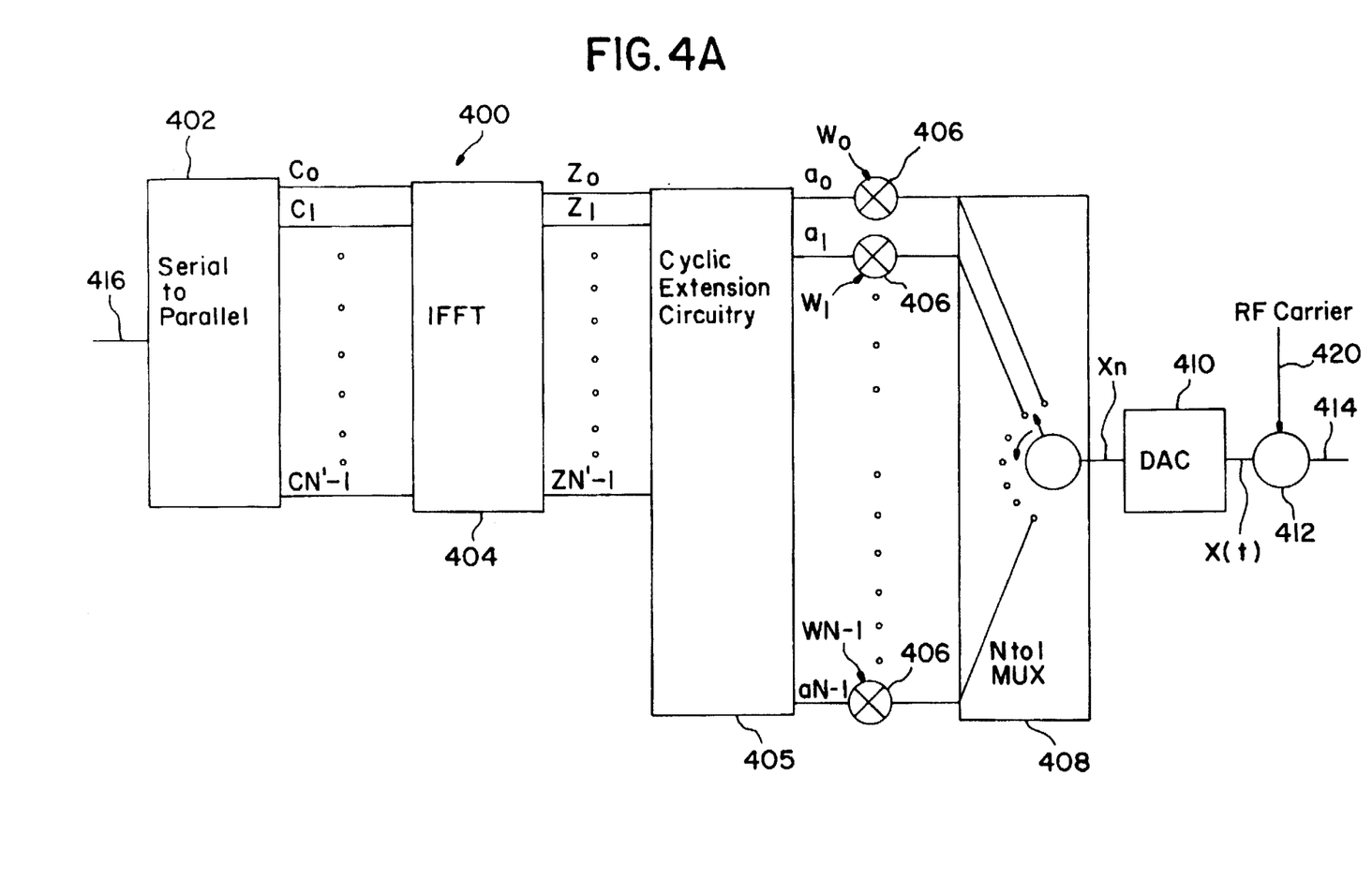
FIGS. 4A and 4B show schematic block diagrams of a transmitter and receiver, respectively, of an OFDM system operating according to the teachings of the present invention.
Figure 4B:
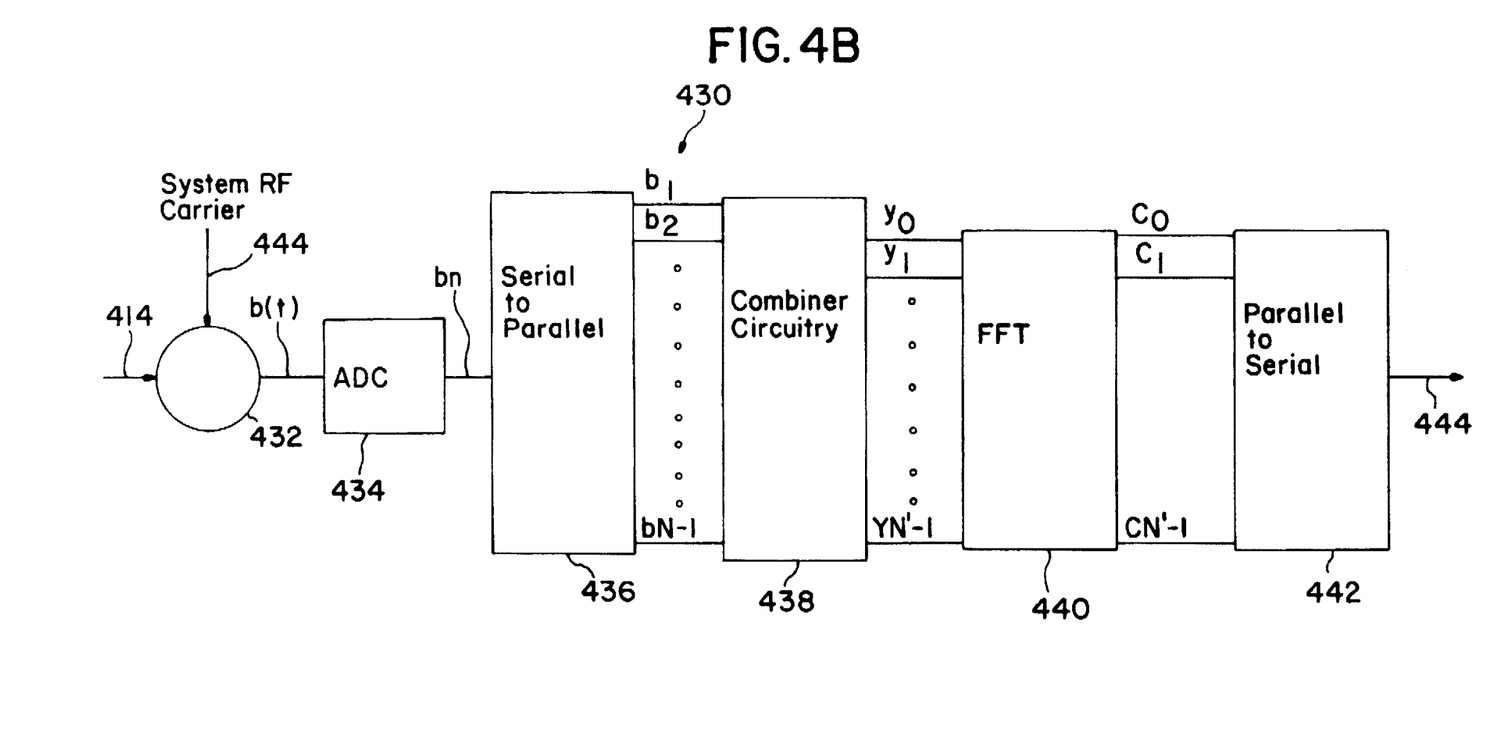

Referring now to FIGS. 4A and 4B, therein are shown schematic block diagrams of a transmitter 400 and receiver 430, respectively, of an OFDM system operating according to the teachings of the present invention. Transmitter 400 and receiver 430 are one of many possible hardware configurations for implementing the invention. In this embodiment OFDM symbol period T and the number of time samples N transmitted in each period T are kept constant as compared to the above described conventional OFDM. The number N' of data symbols $C_k$ transmitted per OFDM symbol decreases as a result of pulseshaping. In the embodiment of the invention the number N' of data symbols $C_k$ transmitted equals the number N' of subcarriers used and is defined as N'=N/∝.

The transmitter 400 includes a serial to parallel converter 402, inverse fast fourier transform (IFFT) circuitry 404, cyclic extension circuitry 405, pulseshaping multipliers 406, an N to 1 multiplexer (Mux) 408, a digital to analog converter (DAC) 410 and a modulator 412. In transmitter operation, serial to parallel converter 402 converts a serial digital data stream 416 containing N' data symbols $C_k$, k=0, ..., N'-1, into one OFDM block (OFDM symbol). The N' data symbols $C_k$ comprising the OFDM block are then input into IFFT circuitry 404. Each symbol $C_k$ is input to the input associated with the subcarrier having the frequency $f_k$. The outputs for k=0, ..., N'-1 of IFFT circuitry 404 are now each represented by:

$$z_n = \sum_{k=0}^{N'-1} C_k e^{j2\pi k n/N}, n = 0, 1 \ldots, N'-1$$

The output of the N'-point IFFT (signals wherein $z_n$, n=0, ..., N'-1) represents time series signal carrying the data it is desired to transmit. Because in this embodiment of the invention the OFDM symbol time (FFT frame) T and number of time samples N in each period T remain constant for a given frequency bandwidth, a cyclic extension is performed on the signal $z_n$ in cyclic extension circuitry 405 to generate a signal $a_n$ having N samples over the time period T.

In the cyclic extension circuitry 405, a number of first consecutive signals of the series $z_n$ are placed at the end of the time discrete series $a_n$, and a number of the last consecutive signals of the series $z_n$ are placed at the beginning of the time discrete series $a_n$. The signal $a_n$ is defined by:

$$a_n = z_{(n-(N-N')/2) \bmod N'}, n=0, 1, \ldots, N-1$$

Figure 6A:
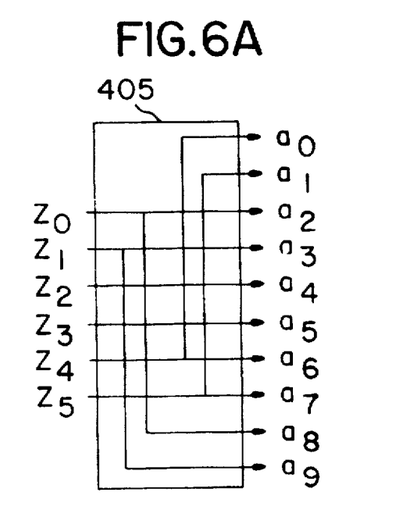
FIGS. 6A and 6B illustrate the generation of data signals by cyclic extension circuitry and combiner circuitry, respectively, in an embodiment of the invention.

Referring now to FIG. 6A, therein is illustrated the function performed by cyclic extension circuitry 405. FIG. 6A illustrates an example in which the number N of the samples in each OFDM symbol equals 10 and, the number N' of data symbols $C_k$ equals 6.

In order to perform pulseshaping in the time domain, the time series signal an is multiplied in the pulseshaping multipliers 406 by the appropriate constants $w_n$, n=0, ..., N-1, from the time discrete pulseshaping function, having a chosen rolloff factor B, to generate the values $x_k$, k=0, ..., N-1. The time discrete pulseshaping function is defined as:

$$w_n = \frac{1-\cos(2\pi n/NB)}{2}, 0 \leq n < \frac{N}{2}B$$

$$w_n = 1, \frac{NB}{2} \leq n < N - \frac{NB}{2}$$

$$w_n = \frac{1-\cos(2\pi(N-n)/NB)}{2}, N - \frac{N}{2}B \leq n < N,$$

The discrete outputs $x_n, \ldots, x_{N-1}$ are then time multiplexed through Mux 408 to form the discrete time series represented by the equation:

$$x_n = w_n \sum_{k=0}^{N'-1} C_k e^{j2\pi k l/N}, n = 0, \ldots, N-1$$

where l=(n-(N-N')/2)mod N'. The discrete time series $x_n$ is then input to DAC 410 where it is converted to an analog waveform x(t). The analog waveform x(t) is then input to modulator 412 where the analog waveform 418 is modulated onto the system RF carrier at $f_c$ and transmitted on the system RF channel 414.

Receiver 430 includes demodulator 432, analog to digital converter (ADC) 434, serial to parallel converter 436, combiner circuitry 438, fast fourier transform (FFT) circuitry 440 and serial to parallel converter 442. In receiver operation, the system RF carrier is received on the system RF channel 414 and demodulated from the system RF carrier at demodulator 432 to obtain the received analog waveform b(t) which is the received version of the transmitted waveform x(t). The analog waveform b(t) is then input to ADC 434 where it is converted to a discrete time series signal $b_n$. The discrete time series signal $b_n$ is then input to serial to parallel converter 436 and converted into a parallel data signal. The parallel data signal is then input to combiner circuitry 438. The combiner circuitry 438 combines the N samples of $b_n$ into N' samples to form a discrete time series signal $y_n$. In the combiner circuitry 438 the discrete time series $b_n$ is processed to generate the discrete time series $y_n$, for n=0, ..., N'-1. The signal $y_n$ is defined by:

$$y_n = b_{n+(N-N')/2} + b_{n+(N+N')/2} + b_{n(N-3N')/2}$$

Figure 6B:
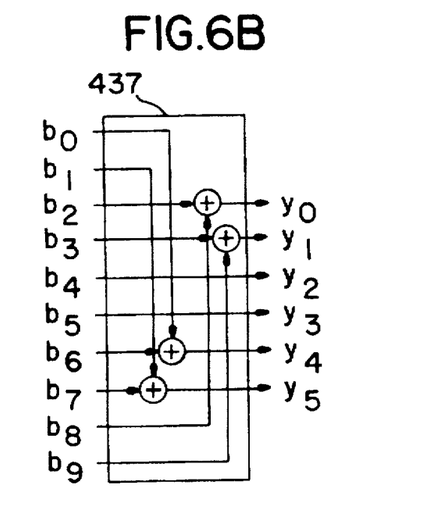

Referring now to FIG. 6B, therein is illustrated the function performed by combiner circuitry 438. FIG. 6 illustrates the example of combining the signal $b_n$ where N=10 and N'=6. $b_n$ is the received version of the transmittal signal an formed in the example illustrated in FIG. 6A.

$Y_n$ is then input to the FFT circuitry 440. An FFT is then performed on the N' samples of the discrete time signal $y_n$ to retrieve the transmitted data symbol $C_k$ received where:

$$C_k \text{ received} = \frac{1}{N'} \sum_{n=0}^{N'-1} y_n e^{-j2\pi k n/N'}, k=0 \ldots, N'-1$$

The data symbols, $C_k$ received of the OFDM block, are then input to parallel to serial converter 442 where they are converted into serial data 444.

The identical process is repeated in transmitter 400 and receiver 430 for each OFDM block (OFDM symbol) of N' data symbols that are to be transmitted.

While utilizing the raised cosine function for pulseshaping reduces the number of usable frequencies by a factor of ∝, as compared to an OFDM system without pulseshaping having the same frequency band, the method and system of the invention is flexible and allows for alternate embodiments in which different pulseshaping functions are used. For example, the raised cosine function known or the time discrete Hanning function, in which B=1 and ∝=2, may be used in the embodiment of the invention in FIGS. 4A and 4B. The time discrete Hanning function is defined as:

$$w_n = \frac{1-\cos(2\pi n/N)}{2}$$

Using the Hanning function for pulseshaping reduces the number of usable subcarrier frequencies by a factor of 2. As the rolloff factor B of the pulseshaping function chosen moves from 1 toward 0, the number of usable frequencies increases while the spectral decay rate and ISI immunity decreases.

By choosing a particular pulseshaping function, the number of usable frequencies can be increased by trading off speed in the rate of spectral decay. The particular pulseshaping function used may be chosen according to the requirements of the particular system in which the invention is implemented. For example, FIGS. 3B and 3C show that for the pulseshaping function given by $w_1(t)$, which has a rolloff factor B of ½, the number of usable frequencies decreases by a factor of one and a half, as opposed to a factor of two when B equals one. However, the lower B results in less ISI immunity.

While the embodiment described uses the raised cosine function as the pulseshaping function, other types of pulseshaping functions may also be used. The critical factor is that the pulseshaping function have a portion of its amplitude less than its maximum amplitude so that the transmitted waveform is shaped by the pulseshaping.

As can be seen from the above description, the invention provides a method and system of pulseshaping for data transmission in an OFDM system. Use of the invention will enhance the performance of OFDM systems into which it is implemented. Performance is enhanced by the reduction of intersymbol interference (ISI) between data symbols that is caused by Doppler spread. Performance is also enhanced by the reduction of ISI between OFDM symbols in different time periods that is caused by time dispersion effects. Use of the invention also reduces out of band interference.

It is believed that the operation and construction of the present invention will be apparent from the foregoing description and, while the invention shown and described herein has been characterized as a particular embodiment, changes and modifications may be made therein without departing from the spirit and scope of the invention as defined in the following claims.

What is claimed is:

1. In a telecommunications system in which communications between a transmitter and a receiver are carried on a plurality of subcarriers over a communications channel on a system carrier, a method of transmitting data over said communications channel, said method comprising the steps of:

modulating each of a plurality of data symbols onto one of a plurality of subcarriers to generate a plurality of modulated subcarriers, said modulated subcarriers comprising a first data signal;

multiplying said first data signal by a pulseshaping waveform to generate a second data signal, said pulseshaping waveform comprising a function having at least one first and second amplitude wherein said first amplitude is greater than said second amplitude; and transmitting said second data signal on said system carrier.

2. The method of claim 1 in which said system carrier has a frequency $f_c$ and said step of modulating comprises:

modulating each of a plurality of data symbols $C_k$, having a symbol period T, onto a subcarrier having a frequency $f_k$, for k=0, ..., N'−1, wherein $f_k = f_c + \propto k/T$ and $\propto$ is a constant greater than 1, said modulated subcarriers comprising said first data signal.

3. The method of claim 2 further comprising the steps of:

receiving a third data signal y(t) at a receiver, said third data signal comprising said second data signal after transmission on said system carrier; and detecting said set of data symbols $C_k$, k=0, ..., N'−1, at said receiver.

4. The method of claim 2 wherein said pulseshaping waveform comprises a raised cosine pulse having a predetermined rolloff factor.

5. The method of claim 4 wherein said pulseshaping waveform comprises a Hanning function.

6. The method of claim 1 in which said step of modulating comprises:

performing an N'-point inverse fast fourier transform (IFFT) on a plurality of data symbols to generate said first data signal.

7. The method of claim 6 in which said step of multiplying comprises:

cyclicly extending said first data signal to generate an extended data signal; and multiplying said extended data signal by a time discrete pulseshaping function to generate said second data signal.

8. The method of claim 7 further comprising the steps of:

receiving a third data signal at a receiver, said third data signal comprising said second data signal after transmission on said communication channel;

combining said third data signal to generate a fourth data signal; and performing an N'-point fast fourier transform (FFT) on said fourth data signal to generate said set of data symbols.

9. The method of claim 7 wherein said pulseshaping function comprises a time discrete raised cosine function having a predetermined rolloff factor.

10. The method of claim 9 wherein said pulseshaping function comprises a time discrete Hanning function.

11. The method of claim 1 in which said system carrier has a frequency $f_c$, and said step of modulating comprises:

performing an N'-point inverse fast fourier transform (IFFT) on said data symbols, said data symbols comprising a plurality of symbols $C_k$, k=0, ..., N'−1, each having a symbol period T, to generate a first data signal, said first data signal comprising a signal $z_n$ comprising N' time discrete values each of said time discrete values being associated with a frequency $f_k$, for k=0, ..., N'−1, in the frequency domain, where $f_k = f_c + \propto k/T$ and $\propto$ is a constant greater than one.

12. The method of claim 11 in which said step of multiplying comprises:

cyclicly extending said first data signal $z_n$ over said symbol period T to generate an extended data signal an comprising N time discrete values; and multiplying said extended data signal $a_n$ by a time discrete pulseshaping function $w_n = w_0, w_1, ..., w_{N-1}$, over said period T to generate said second data signal $x_n = w_n a_n$, n=0, ..., N−1, said pulseshaping function having a first amplitude $w_{n1}$, and a second amplitude $w_{n2}$, wherein said first amplitude is greater than said second amplitude.

13. The method of claim 12 further comprising the steps of:

receiving a third data signal $b_n$ at a receiver, said third data signal comprising said second data signal $x_n$ after transmission on said communications channel;

combining said third data signal $b_n$ over said symbol period T to generate a fourth data signal $y_n$ comprising N' time discrete values; and performing an N'-point fast fourier transform (FFT) on said fourth data signal $y_n$ to generate said set of data symbols $C_k$, k=0, ..., N'−1.

14. The method of claim 12 wherein said pulseshaping function $w_n$ comprises a time discrete raised cosine function having a predetermined rolloff factor.

15. The method of claim 14 wherein said pulseshaping function $w_n$ comprises a time discrete Hanning function.

16. An apparatus for transmitting data in a telecommunications system in which communications between a transmitter and a receiver are carried on a plurality of subcarriers over a communications channel on a system carrier, said apparatus comprising:

- inverse fast fourier transform (IFFT) circuitry for performing an IFFT on a plurality of data symbols and generating a first data signal;
- a multiplier for multiplying said first data signal by a pulseshaping function in a time domain to generate a second data signal, the pulse shaping function comprising a raised cosine pulse having a predetermined rolloff factor; and
- a transmitter for transmitting said second data signal on said communications channel.

17. The apparatus of claim 16 wherein said multiplier comprises:

- cyclic extender circuitry for cyclically extending said first data signal to generate an extended signal; and
- a multiplier for multiplying said extended signal by a pulseshaping function in the time domain to generate said second data signal.

18. The apparatus of claim 16 wherein said plurality of data symbols comprises a first plurality of data symbols, and said apparatus further comprises:

- a serial to parallel converter for converting a serial digital data stream into said first plurality of data symbols.

19. The apparatus of claim 16 wherein said plurality of data symbols comprises a plurality of data symbols $C_k$, $k=0, \ldots, N'-1$, each having a symbol period T, and said first data signal comprises a signal $z_n$ comprising N' time discrete values, each of said time discrete values being associated with a frequency $f_k$, for $k=0, \ldots, N'-1$, in the frequency domain, where $f_k = f_c + \propto k/T$ and $\propto$ is a constant greater than one.

20. The apparatus of claim 19 wherein said multiplier comprises:

- cyclic extender circuitry for cyclically extending said first data signal $z_n$ to generate an extended signal $a_n$ comprising N discrete time values; and
- a multiplier for multiplying said extended signal $a_n$ by a pulseshaping function in the time domain over said period T to generate said second data signal.

21. The apparatus of claim 20 wherein said multiplier comprises a multiplier for multiplying said extended signal $a_n$ by a pulseshaping function $w_n = w_0, w_1, \ldots, w_n$, over said period T to generate said second data signal, said second data signal comprising a signal $x_n = w_n a_n$, $n=0, \ldots, N-1$, and said pulseshaping function having at least a first amplitude $w_{n1}$ and second amplitude $w_{n2}$, wherein said first amplitude is greater than said second amplitude.

22. The apparatus of claim 21 wherein said multiplier comprises a plurality of multipliers, each of said multipliers for multiplying a value $a_n$ of said extended signal by the corresponding value $w_n$ in the time domain to generate said second data signal.

23. The apparatus of claim 21 wherein said pulseshaping function comprises a time discrete raised cosine pulse.

24. The apparatus of claim 23 wherein said pulseshaping function comprises a Hanning function.

25. An apparatus for receiving data in a telecommunications system in which communications between a transmitter and a receiver are carried on a plurality of subcarriers over a communications channel on a system carrier having a frequency $f_c$, said apparatus comprising:

- a receiver for receiving a first data signal transmitted on said communications channel and providing a second data signal $b_n$ comprising N discrete time values;
- combiner circuitry for combining said second data signal $b_n$ to generate a combined signal $y_n$ comprising N discrete time values; and
- fast fourier transform (FFT) circuitry for performing an FFT on said combined signal $y_n$ and generating a plurality of data symbols $C_k$, $k=0, \ldots, N'-1$, each of said time discrete values of $y_n$ being associated in said FFT with a frequency $f_k = f_c + \propto k/T$ and $\propto$ is a constant greater than one.

26. The apparatus of claim 25 wherein said receiver comprises a receiver for receiving said first data signal and a serial to parallel converter for converting said first data signal into said second data signal.

27. The apparatus of claim 25 further comprising a parallel to serial converter for converting said plurality of data symbols into serial data.

28. In a telecommunication system in which communication between the transmitter and receiver are carried on a plurality of subcarriers over a communications channel on a system carrier having a frequency $f_c$, a method of transmitting data over said communications channel, said method comprising the steps of:

- modulating each of a plurality of data symbols $C_k$, having a symbol period T, onto a subcarrier having a frequency $f_k$, where $k=0, \ldots, N'-1$, wherein $f_k = f_c + \propto k/T$ and $\propto$ is a constant greater than one, to generate a plurality of modulated subcarriers, said modulated subcarriers comprising a first data signal;
- multiplying said first data signal by a pulseshaping waveform to generate a second data signal, said pulseshaping waveform comprising a function having at least one first and second amplitude, wherein said first amplitude is greater than said second amplitude; and
- transmitting said second data signal on said system carrier.

* * * * *